Jan. 3, 1956 H. P. FOLKER 2,729,514
TRAIN CONTROL SYSTEM
Filed Dec. 17, 1951 2 Sheets-Sheet 1
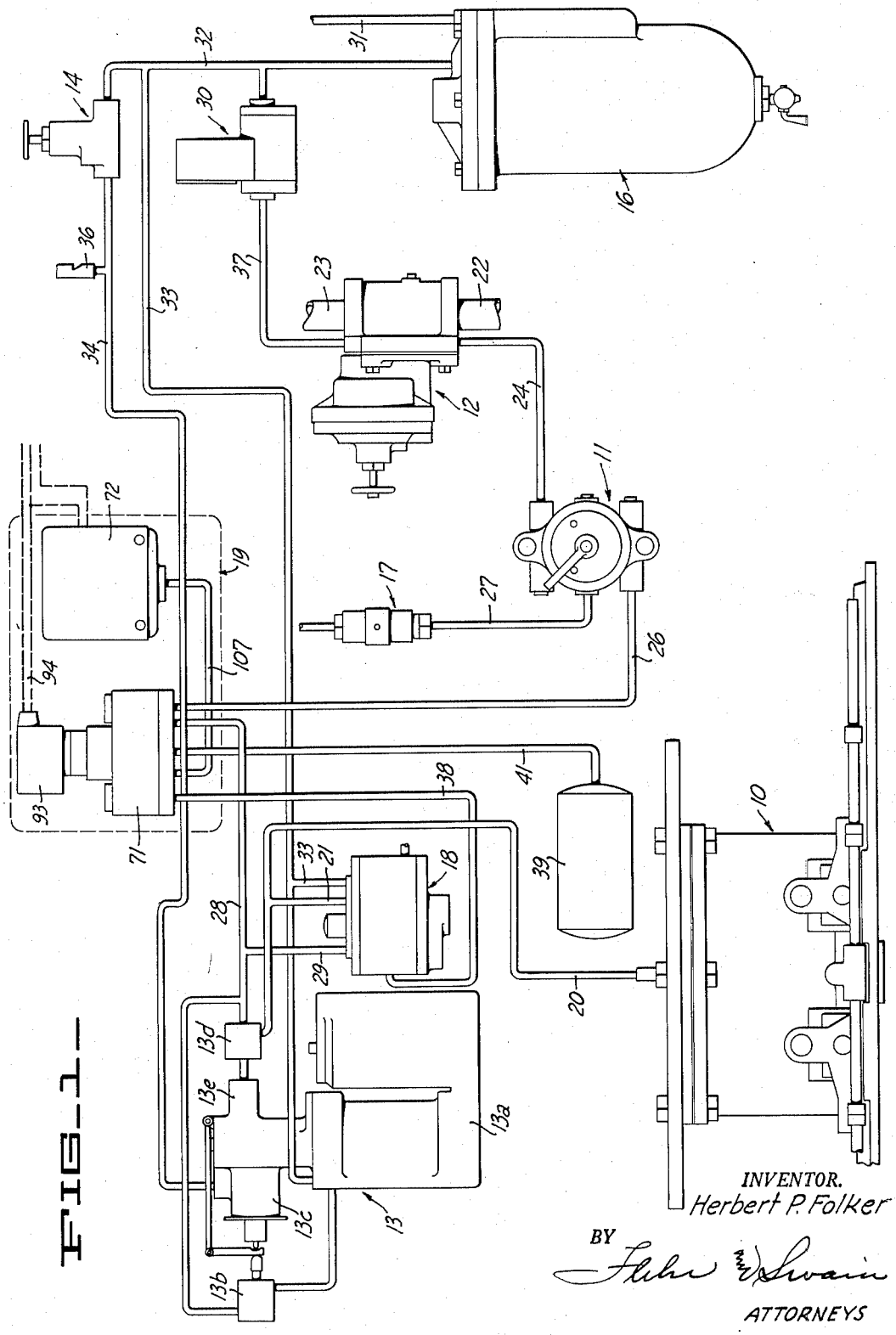
INVENTOR.
Herbert P. Folker
BY
ATTORNEYS

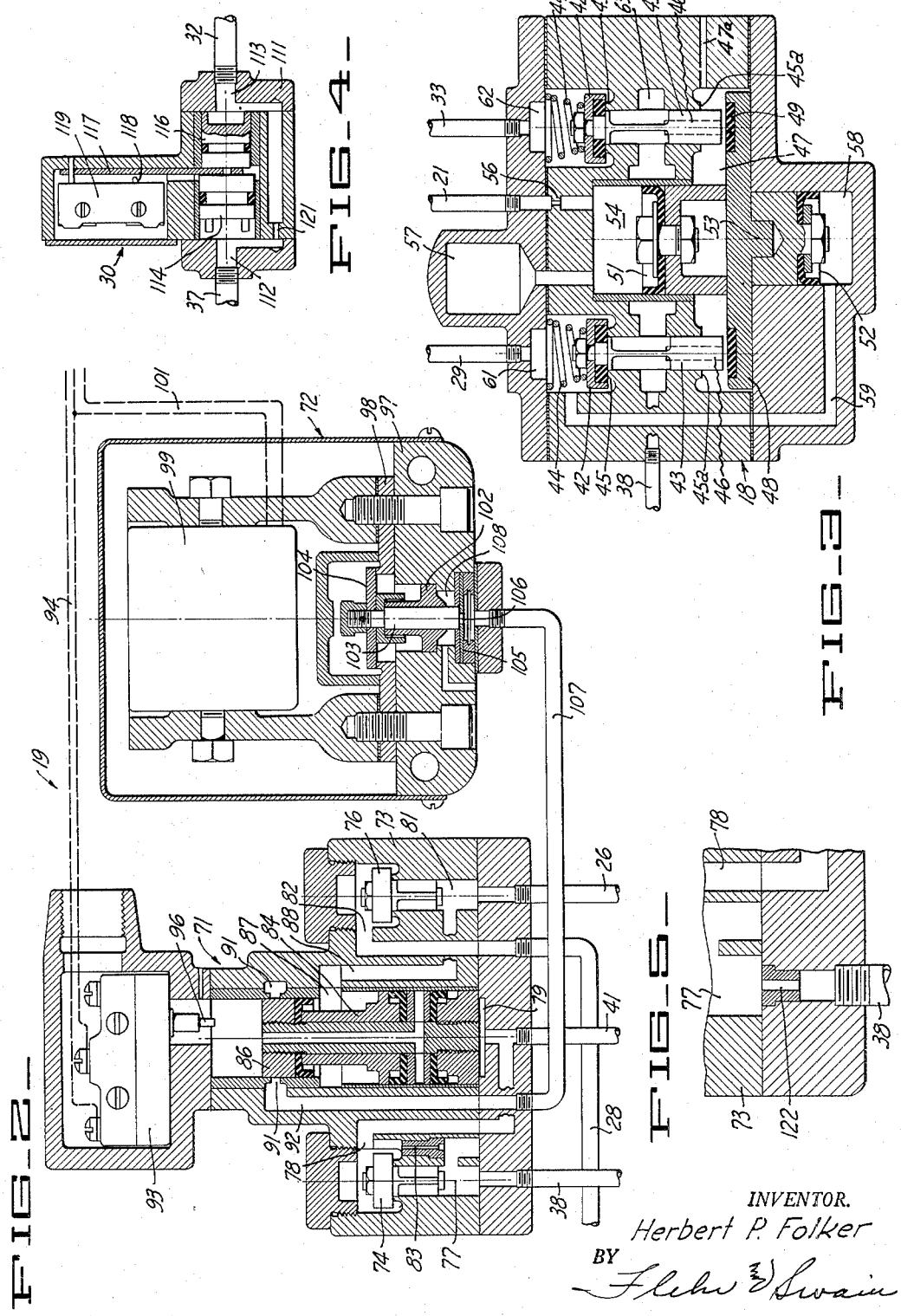

United States Patent Office 2,729,514
Patented Jan. 3, 1956

2,729,514

TRAIN CONTROL SYSTEM

Herbert P. Folker, Oakland, Calif., assignor to National Safety Appliance Co., Ltd., San Francisco, Calif., a corporation of California Application December 17, 1951, Serial No. 262,107

16 Claims. (Cl. 303—18)

This invention relates generally to train control systems of the type adapted to effect automatic brake applications and provided with forestalling means to prevent brake applications under certain conditions.

Conventional systems for the automatic control of train brakes incorporate means on the locomotive adapted under certain conditions (e. g. the entry of the train into a restricted or danger zone) to receive a track impulse to vent the main brake pipe of the pneumatic braking system of the train and thereby cause automatic application of the brakes. Forestalling devices such as have been used with such systems employ a time delay mechanism having an automatic cycle which is put in operation when the engineer actuates a forestalling device. In the event a track impulse is received by the system during the time delay afforded by the forestalling mechanism, a brake application does not occur. Should the engineer fail to make timely operation of the forestalling device, an automatic brake application occurs in response to a track impulse, and then the train is stopped, thus requiring the engineer to leave his accustomed position in the locomotive cab to carry out a restoring operation. In train control systems of the type described in Folker et al. 1,439,081 and 1,690,816, a magnetic track impulse is utilized which directly operates one of a pair of valves incorporated in a "duplex control valve" whereby a pipe line leading to an automatic train stop valve is vented to secure a brake application. One forestalling unit previously utilized with a system of the Folker type (see Patent 1,592,930) serves to automatically shut off the line leading from the automatic stop valve to the duplex control valve, and to vent the line leading to the duplex control valve to thereby prevent operation of the same in response to a track impulse. The forestalling unit may either be of the direct manually operated type, or of the remote operated type as disclosed in Folker 2,486,271. A system of the Folker type may also employ a line charger as disclosed in said Patent 2,486,271, to enable rapid build-up of pressure in the control pipe leading to the duplex control valve, at the end of the forestalling period. In many instances a hazard is created if the engineer forestalls an automatic brake application in a restricted zone, but proceeds at a speed which is less than a minimum speed which may be imposed by speed governing means, but greater than the moderate speed that should be observed at such time. Such operation may result in a collision or other accident, which would have been avoided if a moderate speed had been observed.

It is an object of the present invention to provide an improved train control system of the above character which incorporates provision for forcing the engineer to be at or below a specified medium or moderate speed, before a forestalling operation prevents an automatic brake application.

Another object of the invention is to provide an improved system of the above character which will apply the desired enforcement as to speed for a period of time which includes both the forestalling period and an additional fixed time interval.

Another object of the invention is to provide an improved system of the above character making use of a special speed imposing unit in conjunction with a line charger of the type disclosed and claimed in my Patent 2,486,271.

Another object of the invention is to provide means for disabling dynamic braking of a diesel electric locomotive in the event of an automatic application of the pneumatic brakes.

Additional objects and features of the invention will appear from the following description in which the preferred embodiment has been set forth in detail in conjunction with the accompanying drawing.

Referring to the drawing:

Figure 1 is a schematic view illustrating a train control system incorporating the present invention.

Figure 2 is a schematic view in section illustrating the so-called speed imposing unit which is incorporated in the system of Figure 1.

Figure 3 is a schematic sectional detail illustrating the line charger incorporated in the system of Figure 1.

Figure 4 is a schematic detail in section illustrating a pneumatic pressure switch is incorporated in the system of Figure 1.

Figure 5 is a schematic detail in section, showing a modified form of speed imposing unit.

The train control system illustrated in Figure 1 consists of a duplex train control valve 10 of the type adapted to be operated by a magnetic track impulse, and as disclosed for example in Letters Patent 1,439,081, 1,439,082, 1,592,930, 1,690,816 and 2,566,444. In conjunction with the duplex control valve, there is a release or restoring valve 11, an automatic train stop valve 12, and a forestalling unit 13. Located at a point remote from the forestalling unit there is a manually operated forestalling valve 14. Also the system may include an air strainer 16, and a double heading interlocking valve 17. The release or restoring valve 11, the valve 17, and the double heading cut-off cock, can be substantially as shown and described in Folker 1,690,816.

In addition to the parts or units referred to above, my system includes the line charger 18, together with the speed imposing unit 19. These parts cooperate with other parts of the system to make possible the desired enforcement of a given medium or moderate speed when passing through a danger or restricted zone.

The piping illustrated in Figure 1 is as follows: Control pipe 20 serves to connect the duplex control valve 10 to the forestalling unit 13. A branch 21 from this pipe connects with the line charger 18. The train stop valve 12 is connected by pipe 22 to the brake pipe of the train braking system. Pipe 23 connects valve 12 to the engineer's automatic brake valve. Control line 24 connects the stop valve with the double heading and release valve 11, and from the latter another control line 26 connects to the speed imposing unit 19. A pipe line 27 connects the release valve 11 with the interlocking valve 17. Control line 28 connects the speed imposing unit with the forestalling valve, and a branch 29 from line 28 connects to the line charger 18.

The strainer 16 is connected by line 31 to the main reservoir of the pneumatic braking system, and is also connected by air line 32 with the remote forestalling valve 14, and the pressure operated device 30. A branch line 33 connects the strainer with the forestalling unit. Line 34 connects the remote forestalling valve 14 with the forestalling unit, and may be provided with the signal whistle 36. The pressure operated switch 30 is connected by line 37 to the stop valve 12.

Pipe line 38 connects the line charger 18 with the speed imposing unit 19. A volume reservoir 39 is also connected by pipe 41 to the speed imposing unit.

The forestalling unit 13 can be constructed generally as disclosed in Folker 2,486,271. The various working parts of this forestalling unit can include the hydraulic timer 13a, closure valve 13b, pneumatic actuator 13c, shut-off valve 13d, and valve actuator 13e. In general the forestalling unit operates as follows: When the engineer depresses the button 14, the timer of the forestalling unit is set into operation, and valve 13d is conditioned to vent the control line 20 leading to the duplex control valve 10, and to maintain pressure in the lines 24, 26 and 28, thereby preventing an automatic brake application during the forestalling cycle. At the end of the forestalling cycle communication is reestablished between the lines 20 and 28, and pressure is restored to line 20 to render the system responsive to a track impulse. As explained in said Patent 2,486,271, duplex control valve 10 is mounted upon the train locomotive in position to pass over track magnets located at desired points along the trackway. A track impulse serves to magnetically actuate one of the two valves of the duplex control device, thereby venting the line 20 to the atmosphere through a valve orifice. The magnetically actuated valve is automatically restored when the pressure in line 20 is reduced to atmospheric.

The line charger 18 has been illustrated in detail in Figure 3, and is similar (except for certain alterations) to the line charger disclosed and claimed in Folker 2,486,271. Thus the charger consists of two valve members 42, each of which is carried by a guided fluted stem 43, and is adapted to close under the urge of spring 44 upon the stationary seat 45. A secondary seat 45a is provided about each stem. The lower portions of the stems 43 have central passages 46 which open through the lower ends of the stems into the space 47, the latter being vented to the atmosphere through vent 47a. Below the stems 43 there is a yoke bar 48 which is provided with valve seat inserts 49. The yoke bar 48 is interposed between two opposed pistons 51 and 52. Retention stud 53 is carried by the lower side of the yoke 48 and is fitted within a central opening provided in piston 52. Space 54 above the piston 51 is in restricted communication through orifice 56 with the pipe line 21 and is in unrestricted communication with a closed air chamber 57. This chamber may be a cavity formed within the body of the device, or it may be a separate chamber connected to the device by suitable extension pipes. Space 58 below the smaller piston 52 is connected by duct 59 with the space 61 above the left hand valve member 42. Space 62 above the right hand valve member 42 is in direct communication with the pipe line 33. Intermediate space 63 surrounds the intermediate portions of the stems 43 and communicates with the upper portions of ducts or passages 46 through the valve stems. Thus when both of the valve members 42 are closed as illustrated in Figure 3, space 63 is vented to the atmosphere through the space 47 and vent 47a. Space 63 also connects with the pipe 38 leading to the speed imposing unit.

It can be explained at this point that for a normal condition of this system with full line pressure in the control line 20 and lines or passages 21 and 29, valves 42 are closed as illustrated. At the beginning of a forestalling operation the shut-off valve 13d is operated to shut off communication between pipes 20 and 28, and to vent pipe 20 to the atmosphere. This serves to vent air through the orifice 56 from both spaces 54 and the cavity or chamber 57. This in turn causes such a reduction of pressure in space 54 to cause the lower piston 52 to force the yoke bar 48, together with piston 51, upwardly to cause the inserts 49 to engage and lift the valve stems 43. This operation serves to move the valve members 42 to full open position and at the same time ducts 46 are closed to interrupt communication between spaces 47 and 63. Seals are also established about the stems 43 because of engagement of inserts 49 with seats 45a. When valves 42 are open, spaces 61 and 62 are in communication with space 63 through the flutes of the valve stems 43. Thus pressure from the main reservoir supply line 33 is supplied to spaces 62 and 63, and to the pipe 38.

At the end of the forestalling operation the double seated shut-off valve 13d is positioned in the manner previously described to reestablish communication between lines 20 and 28. Simultaneously air pressure from line 33 is applied to the lines 28 and 29 to quickly build up pressure in line 20 and line or passage 21 to normal value, and without a drop in pressure in lines 24, 26, 28 and line or passage 29, such as would cause operation of the train stop valve 12.

When the pressure in line 20 and line or passage 21 has been built up to substantially normal value, pressure in the chamber or cavity 57 likewise increases to such a value that piston 51 is now urged downwardly with sufficient force to overcome the upper force of the piston 52. Therefore the yoke bar 48 is moved downwardly to cause all of the parts to return to normal position as illustrated in Figure 3.

Restriction 56 serves to retard building up of pressure in the cavity 57 toward the end of the charging interval. Cavity 57 provides an increased capacity for space 54 and thus together with restriction 56 provides a proper interval before cut-out, that is before the pressure in space 54 builds up to a sufficient value to move pistons 51 and 52 in a direction to cause valve members 42 to close and interrupt further supply of air from the main reservoir supply or other supplemental source of air.

From the foregoing it will be apparent that when the line charger is in operation following the beginning of a forestalling cycle, it applies line pressure to the pipe 38 leading to the speed imposing unit 19. This serves to actuate means associated with the speed imposing unit 19 whereby the speed imposing unit becomes effective to enable it to control the automatic braking system for a predetermined time interval.

The speed imposing unit illustrated in Figure 2 comprises two devices 71 and 72, which in practice can be combined in one structure. Device 71 consists of a body 73, which houses the two fluid pressure operated check valves 74 and 76. The inlet passage 77 to valve 74 communicates with pipe 38, and the outlet passage 78 communicates with pipe 41, and with the chamber or space 79. The inlet passage 81 to the check valve 76 communicates with pipe 26, while the outlet passage 82 connects with the pipe 28. The check valve 74 is also by-passed by the flow restricting orifice 83.

The body also forms piston bores for the connected pistons 84 and 86. These pistons are formed to different diameters, the piston 84 being the larger. The space 87 between the pistons 84 and 86 is connected by duct 88 with the inflow passage 81 of the check valve 76, and to the pipe line 26. When piston 86 is raised to its upper limiting position, the ports 91 are uncovered, thus establishing communication between the space 87 and the duct 92. Piston 84 can be made in two spaced parts as illustrated, with the space between the same being vented to the space above the piston 86, which in turn is vented to the atmosphere.

In order to provide means for visually indicating when the speed imposing unit is in operation, I have provided an electrical switch 93, which is connected to a suitable electrical signalling circuit 94, as for example one including a signal lamp. The contact operator 96 of this switch is positioned whereby when the piston 86 is in its raised position, the contacts of the switch are closed.

The device 72 is in the form of an electropneumatic valve. It consists of a body 97 serving to mount the magnetic pole pieces 98, and the wound electromagnet 99. The winding of the electromagnet is shown connected to a control circuit 101, forming a part of a speed governor system, as shown in copending application 222,432, filed April 23, 1951.

The valve means of device 72 consists of a guide bushing 102 which is fixed in the body 97, and which guides the valve member 103. The upper end of this member is attached to the magnetic armature 104, which bridges the pole pieces 98 for the lowermost (i. e. closed) position of the valve. The lower end face of member 103 seals upon a seat member 105 of leather, synthetic rubber or like resilient material. This seat is attached to the body and has a central orifice 106 which is opened when the member 103 is raised. The inflow side of this valve means is connected by the pipe or passage 107 to the duct 92. The other side 108 is vented to the atmosphere.

Normally the circuit 101 is closed, and it includes a source of current whereby the winding of the electromagnet 99 is normally energized through the speed recorder circuit and the medium speed switch incorporated in the same. This serves to hold the valve member in closed position. When the circuit 101 is opened, whereby the winding is de-energized, pressure in pipe 107 forces the valve member 103 to open position, thereby permitting substantially unrestricted venting to the atmosphere. After being opened the valve member 103 remains open by air flow through the same and does not close until pressure in line or passage 107 is reduced to atmospheric, as by operating release valve 11.

While device 72 is preferably operated electrically, it may be operated pneumatically or mechanically by suitable connection with the speed governor.

Operation of the speed imposing unit, and its cooperation with other parts of the system, will be described after a description of the pressure operated switch illustrated in Figure 4. The body 111 of this switch is provided with passages 112 and 113, which communicate with the pipes 37 and 32. Pistons 114 and 116 are slidably fitted within the body, and are connected for conjoint movement. A spring finger 117 extends laterally from the piston assembly, and is arranged to engage the operating member 118 of the normally open electrical switch 119. A flow restricting orifice 121 forms a by-pass which connects the passages 112 and 113. This restriction takes the place of the flow restriction normally present in the train stop valve 12. When the differential fluid pressure between the passages 112 and 113 is sufficiently great, the pistons are urged to the left as viewed in Figure 4, to cause the finger 117 to operate the switch 119.

When the present pneumatic system is used in conjunction with a diesel-electric powered locomotive also having dynamic braking, the control circuit for the dynamic braking system can be connected to include the switch 119. When this switch is operated by a pressure differential which occurs during the time line 37 is bled off to the atmosphere through train stop valve 12 as described in the aforementioned patents, the dynamic braking system is rendered ineffective or is cut out. This condition is maintained until release valve 11 is operated as hereinafter described. The engineer may proceed down a grade with a light locomotive under dynamic braking. If under such conditions a track impulse is received, switch 119 is operated to nullify dynamic braking automatically, and to permit an automatic pneumatic brake application.

If desired the device of Figure 4 can be built as a part of the train stop valve 12.

Operation of my complete system can now be described as follows: The speed governor to which the circuit 101 is connected is provided with contacts which are opened when a given medium speed (e. g. 40 M. P. H.) has been attained. At or below 40 M. P. H. the winding of electromagnet 99 is energized to hold the valve member 103 closed. Normally the other parts of the speed imposing unit are in the positions illustrated in Figure 2. In other words both of the check valves 74 and 76 are closed, and the pistons 84 and 86 are in their lowermost positions. Line pressure is applied to the pipe 37 and also to the pipes 20, 21, 24, 26, 28 and line or passage 29. The parts of the line charger are normally in the positions illustrated in Figure 3, and line pressure also exists in pipe 28 and line or passage 29, because such pressure is transmitted through the check valve 76. Also line pressure is applied to pipes 20 and 21 because pipe 20 is in communication with line 28 through the valve 13d. Both of the valves of the duplex control valve 10 are closed, and are held closed by the permanent magnets incorporated in the same. Assuming that the train enters a restricted or danger zone, and a track impulse is received without any operation of the forstalling unit, one of the valves of the duplex control valve 10 is opened, thus venting line 20 to the atmosphere. This serves to vent pipes 28, 26 and 24, to cause operation of the train stop valve 12. As a result the brakes of the train are applied automatically. As disclosed in the patents previously mentioned, after each automatic brake application it is necessary for the engineer to leave his accustomed position in the cab and operate the restoring valve 11. This serves to temporarily interrupt communication between pipes 24 and 26, and whereby the pressure in line 20 falls to atmospheric to permit automatic resetting of the magnetically actuated valve of the duplex control valve 10. Release valve 11 is now restored to its normal position to reestablish communication between pipes 24 and 26.

Assuming now that the locomotive enters a restricted zone at a proper speed of say 40 M. P. H. or less, an alert engineer may forestall an automatic brake application by operating the forestalling valve 14. As described in said Patent 2,486,271, this sets the forestalling unit in operation, whereby for a predetermined forestalling interval, valve 13d interrupts communication between pipes 28 and 20, and vents pipe 20 to the atmosphere. Under such conditions a track impulse can not cause operation of the duplex control valve, and therefore cannot cause an automatic brake application.

At the commencement of a forstalling operation as described above, venting of pipe 20, together with pipe 21, reduces the pressure in chambers 54 and 57 of the line charger, thus causing pistons 51 and 52 to move upwardly. Yoke 48 is therefore moved upwardly to engage the lower ends of the valve stems 43, and to lift the valve members 42 from their seats 45. This has the effect of connecting the air supply line 33 with the line 38 and line or passage 29. At the end of the forestalling cycle, when valve 13d is again operated to reestablish communication between pipes 20 and 28, air supply pipe 33 has direct communication through the line charger with pipe or passage 29, to prevent a drop in pressure in the line 28 due to the air supply required for building up pressure in line 20. At the same time pressure applied by pipe 21 through the restricted orifice 56, builds up pressure upon the piston 51, until this piston moves downwardly, together with the piston 52, to again close the valves 42. Air flow through the restricted orifice 56 to build up pressure in chambers 54 and 57 requires a time interval which is adequate to insure proper charging of line 20 from the air supply line 33.

Assuming now that the operator carries out a forestalling operation, but in addition proceeds at a speed above 40 M. P. H. or other set value, then an automatic brake application takes place. As previously pointed out after initiating a forestalling cycle, line pressure is applied through pipe 38 to the speed imposing unit 19. Such line pressure is applied to the passage 78 and the chamber 79, to the lower side of the piston 84. This causes the piston 84 to be raised whereby the piston 86 uncovers the port 91. Passages 88 and 92 are now placed in unrestricted communication. Exceeding the speed (e. g. 40 M. P. H.)

limit of the speed governor or recorder causes the winding of electromagnet 99 to be deenergized with the result that the valve member 103 is no longer magnetically held against its stationary seat. Control pipe 26 therefore vents to atmosphere through the passages 81 and 88, port 91, passage 92, pipe or passage 107, valve orifice 106, and the passage 108, to cause an automatic brake application.

It will be noted that opening of valve 103 will not cause an automatic brake application, unless simultaneously with such opening, pressure is being applied by way of pipe 38 due to operation of the forestalling unit. Therefore the electromagnetic valve will not cause an automatic brake application unless it opens after the commencement of a forestalling operation, or if a forestalling operation is attempted after the electromagnetic valve has been opened by speed in excess of say 40 M. P. H.

Preferably the electropneumatic valve continues to be effective to cause an automatic brake application for a predetermined interval following the forestalling cycle, should the speed during such interval exceed say 40 M. P. H. Thus at the commencement of a forestalling operation, line pressure applied to the speed imposing unit through line 38 also applies air pressure to pipe 41, with the result that the reservoir 39 is pressurized. At the end of the forestalling operation line 38 is vented to the atmosphere, whereby without the use of special means, the speed imposing unit would be immediately restored. However with the arrangement described, when pipe 38 is vented to the atmosphere, backflow of air occurs from the reservoir 39 through pipe 41, passages 78, and the flow restricting orifice 83. This serves to sustain pressure in chamber 79 for a predetermined interval, and during this interval the pistons 84 and 86 remain raised. After a predetermined time interval the pressure in tank 39 has been bled down to a sufficiently low value to cause the pistons 84 and 86 to return to the normal positions shown in Figure 2. It will be evident that during this period of time, following the forestalling cycle, the electromagnetic valve remains effective to cause an automatic brake application.

In the foregoing it is explained that upon operating the forestalling device the speed imposing unit is made effective. In some installations it may be desirable to interpose a time delay between the instant the forestalling device is operated, and the instant the speed imposing unit takes over control. As shown in Figure 5, a flow restricting orifice 122 can be inserted in line 38 to provide such a time delay. This orifice serves to delay effective build-up of pressure in chamber 79 for moving the piston 84, after operation of the forestalling device, thus affording a short predetermined time interval within which the engineer may reduce the train speed to say 40 M. P. H. or less, before the speed imposing unit takes over control.

A feature of my system is that if the speed imposing unit causes a brake application before a forestalling cycle is completed, then the supply of line pressure to the forestalling unit by way of line 28 is continued to enable the forestalling cycle to be completed. This is made possible by the check valve 76 which prevents back flow of air from line 28 to line 26, thus maintaining operating air pressure in the forestalling unit for completing the cycling of the same. Should the engineer forestall and keep down to the prescribed medium speed for the duration of the forestalling cycle, and then come upon another restrictive signal during the imposed medium speed period, he must again forestall to prevent a brake application at the restrictive signal. At the end of the imposed medium speed period the visual indication in the form of a light will go out.

In general it will be evident that my system provides for automatic application of the train brakes in response to a track impulse, provided the engineer does not attempt to forestall such a brake application by operating the forestalling unit. If the engineer operates the forestalling unit, he prevents an automatic brake application by the receipt of a track impulse, and the train is now put under the automatic control of the electromagnetic valve. If, while under the control of the electromagnetic valve, the locomotive proceeds at a speed in excess of the set value of say 40 M. P. H., then the brakes are automatically applied.

I claim:

1. In a pneumatic train braking system including a control valve adapted to be opened in response to a track impulse to vent a control line and an automatic stop valve connected to the control line whereby when the control line is vented said automatic stop valve vents the main brake pipe of the train braking system; a forestalling unit associated with the control line and including a shut-off valve adapted at the beginning of the forestalling cycle to close that portion of the control line leading to said control valve, a branch line, means for placing the branch line in communication with said first named portion of the control line during a forestalling cycle, and additional valve means serving to vent said branch line in response to an excessive train speed.

2. A system as in claim 1 together with means for imposing a time delay between initial operation of the forestalling unit and the instant the additional valve means is opened.

3. In a pneumatic train braking system including a control valve adapted to be opened in response to a track impulse to vent a control line and an automatic stop valve connected to the control line whereby when the control line is vented said automatic stop valve vents the main brake pipe of the train braking system; a forestalling unit associated with a control line and having an automatic cycle of operation adapted to be initiated by an operator, said forestalling unit including a shutoff valve serving at the beginning of the forestalling cycle to close that portion of the control line leading to the automatic stop valve and to vent that portion of the control line leading to said control valve, a branch line, means for placing the branch line in communication with said first named portion of the control line during a forestalling cycle commencing after a predetermined interval following initiating the forestalling cycle, and supplemental valve means serving when open to vent said branch line in response to excessive train speed.

4. A braking system as in claim 3 in which said means for placing the branch line in communication with said first named portion of the control line is effective to maintain such communication for an interval of time greater than the time interval of the forestalling cycle.

5. In a pneumatic train braking system including a control valve adapted to be opened in response to a track impulse to vent a control line and an automatic stop valve connected to the control line whereby when the control line is vented said automatic stop valve vents the main brake pipe of the train braking system; a forestalling unit associated with the control line, said unit including time delay means having an automatic cycle of operation adapted to be initiated by an operator, and a shut off valve in said control line and adapted at the beginning of the forestalling cycle to close that portion of the control line leading to the automatic stop valve and to vent that portion of the control line leading to the control valve, said shut off valve at the end of the forestalling cycle serving to reestablish communication between both portions of the control line, line charging means connected to that portion of the control line leading from the automatic stop valve and serving for a short charging interval to automatically supply said portion of the control line with supplemental air under pressure to recharge the entire control line at the end of the forestalling cycle and to interrupt such supply of supplemental air at the end of said charging cycle, additional valve means adapted to be opened responsive to movement of the train through a restricted zone in excess of a predetermined speed, said valve means serving to vent that portion of the control line leading to the automatic stop valve, and means for rendering said last named valve means effective to cause an automatic brake application, said last means including a pneumatic connection to said line charging means.

6. A system as in claim 5 in which said last named means includes supplemental fluid pressure operated means for effectively connecting said additional valve means to said portion of the control line leading to the stop valve when said line charging means is operated at the commencement of a forestalling cycle.

7. A train braking system as in claim 6 together with pneumatic time delay means for extending the period of time for which said additional valve means is effective, for a predetermined interval of time following the end of the forestalling cycle.

8. A train braking system as in claim 6 together with pneumatic delay means for extending the period of time for which said additional valve means is effective for a predetermined interval of time following the end of the forestalling cycle, said last means functioning to require another forestalling operation to prevent an automatic brake application by a track impulse received during said interval.

9. In a pneumatic train braking system including a control valve adapted to be opened in response to a track impulse to vent a control line and an automatic stop valve connected to the control line whereby when the control line is vented said automatic stop valve vents the main brake pipe of the train braking system, the automatic stop valve having a connection with the air supply reservoir of the braking system through a restricted flow orifice; a movable fluid pressure-operated means providing opposed fluid pressure areas, a body serving to enclose said means and forming fluid chambers adjacent said areas, said chambers having pneumatic connections to opposite sides of said orifice whereby the fluid pressures on opposite sides of said orifice are transmitted to said chambers and applied to said areas, a movable member having one end fixed to said body and having the other end mechanically connected to said means for movement thereby, and control means responsive to movements of said member to control operation of an associated dynamic braking system.

10. A system as in claim 9 in which an electrical switch is operated by said member to control operation of the associated dynamic braking system.

11. A system as in claim 9 wherein said orifice also serves to continuously bleed air through said automatic stop valve and said control valve when said control valve is in an actuated condition.

12. In a pneumatic train braking system including a control valve adapted to be opened in response to a track impulse to vent a control line and an automatic stop valve connected to the control line whereby when the control line is vented said automatic stop valve vents the main brake pipe of the train braking system, the automatic stop valve having a connection with the air supply reservoir of the braking system through a restricted flow orifice; a body formed to provide a pair of generally aligned cylinders, a pair of pistons disposed in the cylinders, a member having one end thereof interposed between the pistons and the other end extending laterally from the pistons and fixed to said body whereby movement of said pistons causes simultaneous movement of the end of said member interposed therebetween, said body forming closed chambers adjacent the remote ends of the pistons, said chambers being in pneumatic communication with the opposite sides of said orifice, and means operated by movements of said member responsive to movements of the pistons to control operation of an associated dynamic braking system.

13. In a pneumatic train braking system including a control valve adapted to be opened in response to a track impulse to vent a control line and an automatic stop valve connected to the control line whereby when the control line is vented said automatic stop valve vents the main brake pipe of the train braking system; a forestalling unit associated with said control line, said unit including time delay means having an automatic cycle of operation adapted to be initiated by an operator and a shut-off valve in said control line and adapted at the beginning of the forestalling cycle to close that portion of the control line leading to the automatic stop valve and to vent that portion of the control line leading to the control valve, said shut-off valve at the end of the forestalling cycle serving to establish communication between both said portions of the control line, a speed imposing unit including a valve adapted to be operated in response to a train speed in excess of a predetermined value together with a fluid pressure operated valve means having one pneumatic connection with said speed responsive valve and a second pneumatic connection with that part of the control line extending between the automatic stop valve and the shut-off valve, said fluid pressure operated valve means being capable of being conditioned either to prevent venting of pressure from the control line through said last-named pneumatic connection, or to form a vent path through the same whereby the control line is vented upon opening of said speed responsive valve, and means for rendering said fluid pressure operated valve means effective to form said vent passage during a forestalling cycle.

14. A system as in claim 13 in which said last named means comprises additional valve means having a pneumatic connection with said fluid pressure operated valve means and another pneumatic connection with said forestalling unit.

15. A system as in claim 13 together with means for imposing a time delay between the operation of the forestalling unit and the instant the fluid pressure operated valve means is made effective.

16. In a pneumatic train braking system including a control valve adapted to be opened in response to a track impulse to vent a control line and an automatic stop valve connected to the control line whereby when the control line is vented, said automatic stop valve vents the main brake pipe in the train braking system, the automatic stop valve having a connection with the supply reservoir of the braking system; flow responsive means pneumatically connected into the line connecting said automatic stop valve to said air supply reservoir, said flow responsive means including a body pneumatically connected into said line, a pair of generally aligned cylinders in said body, a pair of pistons disposed in said cylinders, said body forming chambers adjacent the remote ends of said pistons, a flow passage in said body being in communication with said chambers and joining said pneumatic connections, a restricted flow orifice in said flow passage and disposed between said chambers, said orifice serving to continuously bleed air through said automatic stop valve and said control valve when said control valve is in an actuated condition, a movable member mechanically connected to said pistons for movement thereby, and control means responsive to the movement of said member to nullify dynamic braking upon an automatic brake application.

References Cited in the file of this patent

UNITED STATES PATENTS

| | | |
|---|---|---|
| 1,442,286 | Macloskie et al. | Jan. 16, 1923 |
| 1,644,551 | Thomas | Oct. 4, 1927 |
| 1,685,840 | Farmer | Oct. 2, 1928 |
| 1,991,889 | Farmer et al. | Feb. 19, 1935 |
| 2,239,438 | Cockrell | Apr. 22, 1941 |
| 2,359,168 | Somes et al. | Sept. 26, 1944 |